Aug. 19, 1958
F. W. PORTER
2,847,860
VIBRATING EQUIPMENT
Filed June 4, 1956
3 Sheets-Sheet 1
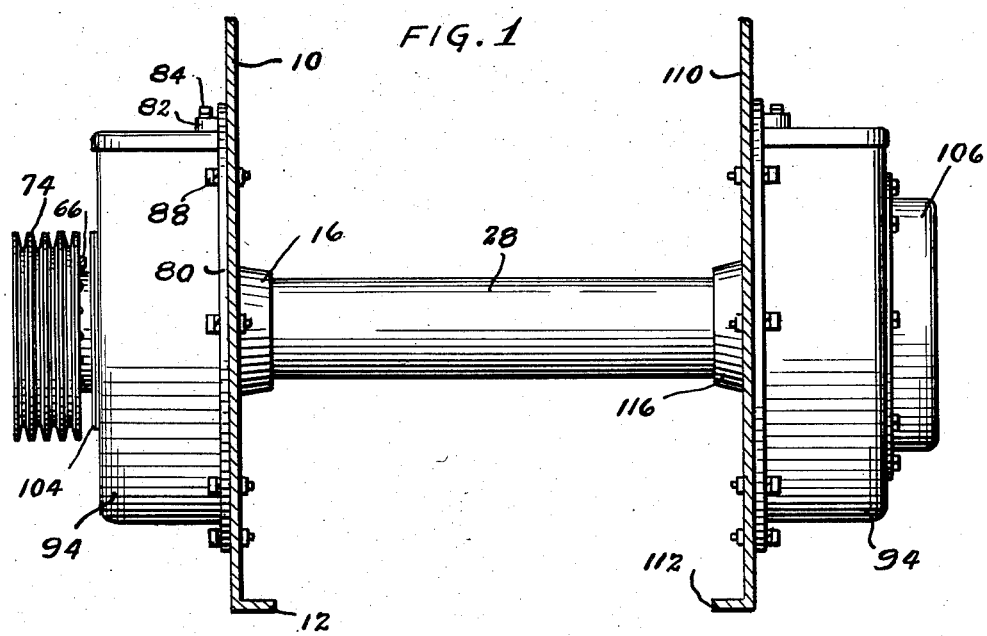
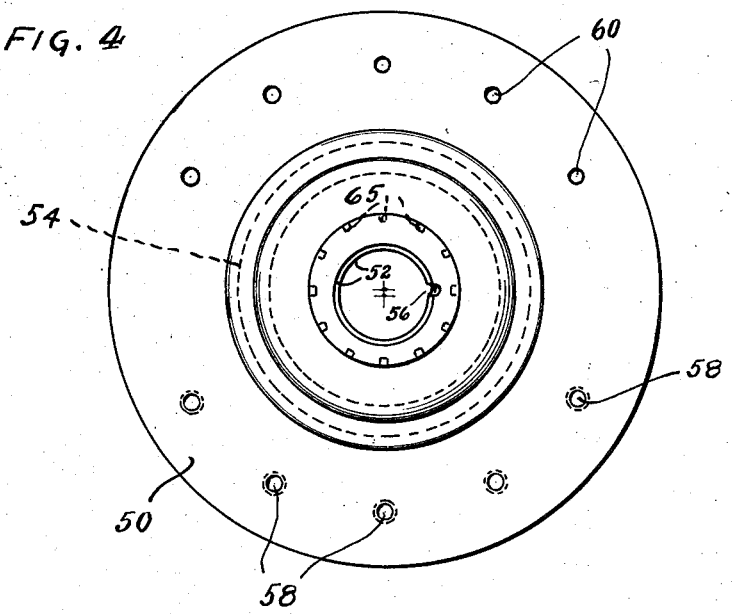
INVENTOR
FRANK W. PORTER
BY Rey Files ATT'Y.

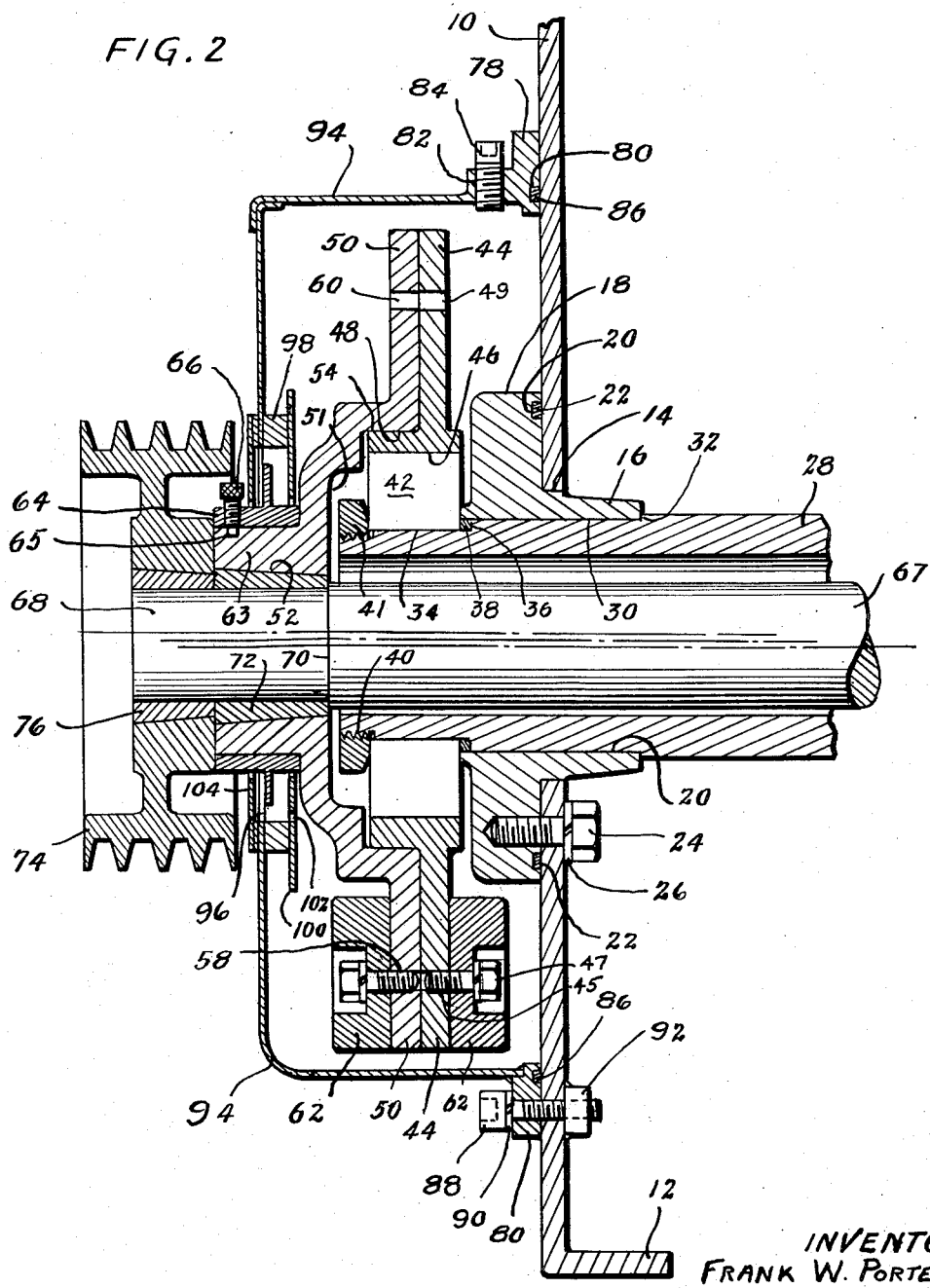

Aug. 19, 1958     F. W. PORTER     2,847,860
VIBRATING EQUIPMENT
Filed June 4, 1956                                           3 Sheets—Sheet 3
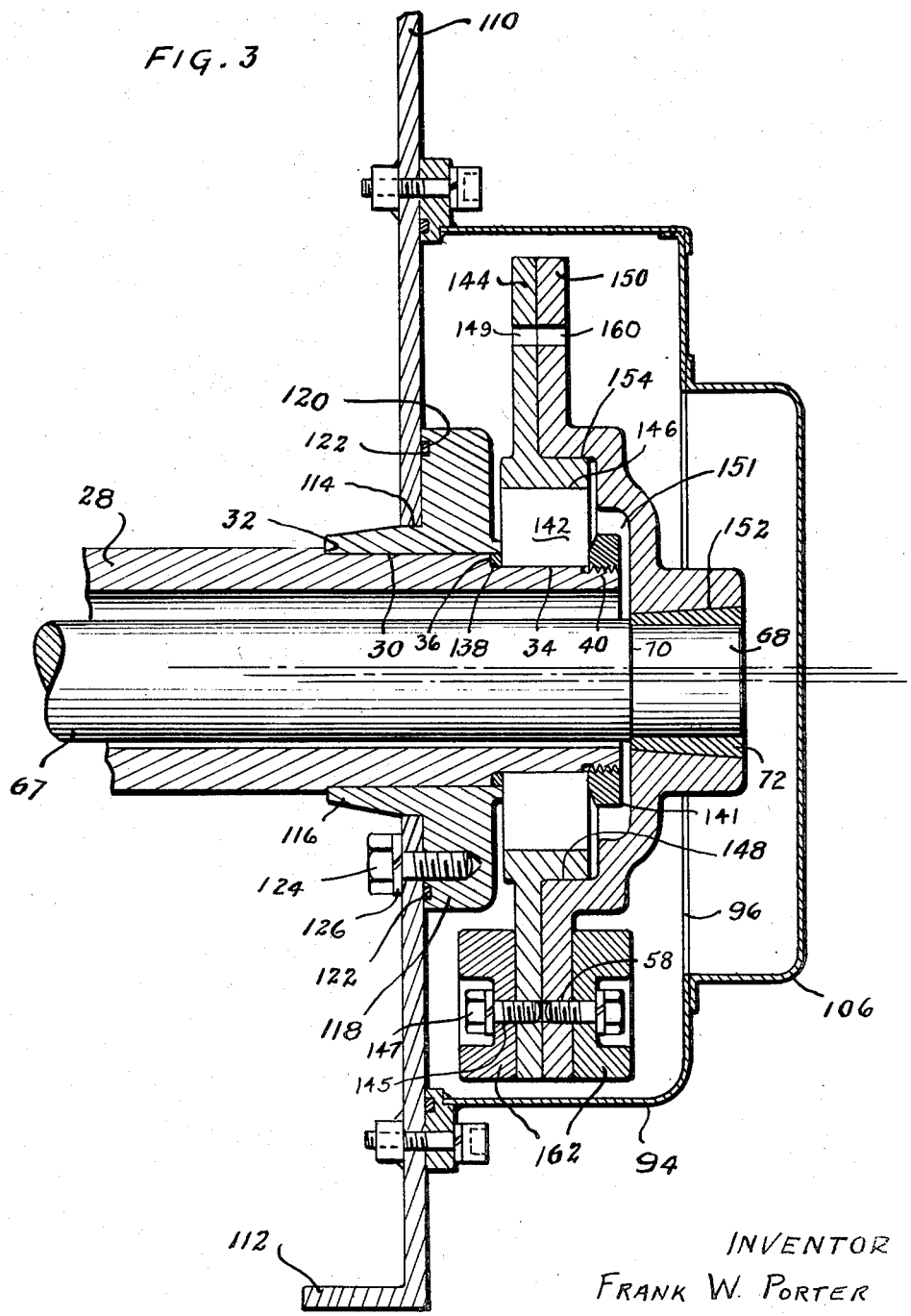
INVENTOR
FRANK W. PORTER
BY Rey Eilers ATT'Y

United States Patent Office 2,847,860
Patented Aug. 19, 1958

2,847,860

VIBRATING EQUIPMENT

Frank W. Porter, Montgomery, Ill., assignor to Productive Equipment Company, Chicago, Ill., a corporation of Illinois Application June 4, 1956, Serial No. 589,127

7 Claims. (Cl. 74—87)

This invention relates to improvements in vibrating equipment. More particularly, this invention relates to improvements in high-speed vibrating screens.

It is therefore an object of the present invention to provide an improved high speed vibrating screen.

In the separating and sizing of products by screens, it is desirable that those products be subjected to rapid vibrations of relatively small amplitude. In recognition of this fact, a number of high speed vibrating screens have been proposed, and some of them have been used. One screen that has been used effectively and widely is disclosed by Lewis E. Soldan, Patent No. 2,267,143, which issued December 23, 1941. The screens made in accordance with that patent have given excellent service and have been well received. The vibrating screen provided by the present invention retains all of the desirable structural features of the vibrating screen of the said patent but additionally provides further desirable structural features.

In the screen disclosed by the said patent, a balance wheel is located at each side of the screen frame, and a shaft extends between and connects those balance wheels. The opposite ends of the shaft are tapered, and the balance wheels have internal tapers which are complementary to the tapers on the opposite ends of the shaft. Those tapers are desirable because they provide ready separability of the balance wheels from the shaft. In theory it is possible to machine the tapers on the shaft with absolute and complete precision, and in theory it is also possible to machine the internal tapers of the fly wheels with corresponding precision; and if the theory could be put into practice, it would be possible to machine the various tapers so they would hold the balance wheels in precisely spaced relation. Precision in the spacing between the balance wheels is essential to minimize side thrust on the bearings which support the rotative parts of the vibrating screen, because that side thrust would increase the frictional losses in that screen, would increase the wear in the screen, and could lead to the breakdown of the screen. Unfortunately, it is impossible, with production line methods, to always attain full and precise machining of an elongated taper on a shaft or in a balance wheel. A manufacturing tolerance of a few thousandths of an inch in the diameter of the taper can cause a greater tolerance in the axial position of the taper on the shaft, particularly where the apex angle of the taper is very small.

The present invention makes it possible to attain the ready separability which tapers afford, and yet it makes it possible to minimize side thrust on the bearings. The present invention attains these results by providing a tapered sleeve at each end of the shaft, by providing tapers in the balance wheels that accommodate the tapered sleeves, by providing shoulders on the shaft that positively limit movement of the tapered sleeves toward each other, and by providing a light fit between the balance wheels and the bearings. The balance wheels cannot be forced too close to each other, and thereby create side thrust on the bearings, because the shoulders positively limit movement of the tapered sleeves and balance wheels toward each other. While the balance wheels might be set farther apart than intended, they could not thereby create side thrust, because the light fit between the bearings and the balance wheels will permit relatively free separating movement of the balance wheels. It is therefore an object of the present invention to provide a high speed vibrating screen that has a shaft with tapered sleeves adjacent each end, that has balance wheels with internal tapers complementary to those of the tapered sleeves, that has shoulders on the shaft to limit movement of the tapered sleeves toward each other, and that has a light fit between the balance wheels and the bearings.

In the screen disclosed by the said patent, the balance wheels are provided with deep recesses to accommodate the lock nuts that hold the inner races of the anti-friction bearings stationary. Those deep recesses can lead to the creation of sizable bending moments when heavy overloads are applied to the screen. In particular, where the eccentric rings of that screen are so set relative to the balance wheels that maximum eccentricity is attained, heavy overloads can create sizable bending moments about a horizontal axis that is parallel to the side walls of the screen frame. In some instances those bending movements can, where the heavy overloads are continued for prolonged periods, cause cracking of the side walls of the screen frame. The present invention prevents cracking of the side walls of the screen frame, even where heavy overloads are permitted to continue for prolonged periods, by forming a bearing-receiving recess, in the overall recess in each balance wheel, that has a depth greater than one half the depth of that overall recess, and also by providing heavy, flanged mounting sleeves that give full support to those side walls.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and do not limit the invention and that the invention will be defined by the appended claims.

In the drawing,

Fig. 1 is a transverse sectional view, intermediate the midpoint and one end, of a high speed vibrating screen that is made in accordance with the principles and teachings of the present invention, Fig. 2 is a larger scale transverse sectional view of the vibration-generating structure at the left hand side of Fig. 1, Fig. 3 is a larger scale transverse sectional view of the vibration-generating structure at the right hand side of Fig. 1, and Fig. 4 is a left hand end view of the balance wheel in the structure of Fig. 2.

Referring to the drawing in detail, the numeral 10 denotes the left hand side wall or side sheet of a screen frame of a high speed vibrating screen. That wall or sheet is made of a sturdy and rugged material such as steel, and it has a flange 12 at the bottom thereof to stiffen that wall or sheet. A similar side wall or side sheet 110 is provided at the right hand side of the screen frame of the high speed vibrating screen. That side wall or sheet has a flange 112 at the bottom thereof to stiffen it. The walls or sheets 10 and 110 can be supported by mounting pedestals of the type used with high speed vibrating screens. One such mounting pedestal is disclosed by Lewis E. Soldan, Patent No. 2,484,191, which was issued October 11, 1949; and another such mounting pedestal is disclosed by Lewis E. Soldan, Patent No. 2,693,331, which was issued November 2, 1954.

The wall 10 has a large circular opening 14 in it, and a heavy and rugged sleeve 16 is dimensioned to extend through the opening 14. The sleeve 16 has a heavy and rugged radially-directed flange 18, and that flange abuts the outer face of the side wall 10. An annular groove 20 is formed at one face of the radially directed flange 18, and that groove accommodates a sealing ring 22. Bolts 24 extend through alined openings in the radially-directed flange 18 and in the side wall 10 and serve to lock the flange 18 in intimate and reinforcing relation with the side wall. Lockwashers 26 are telescoped over the shanks of the bolts 24 before those bolts are passed through the aligned openings. The combination of the heavy flange 18 and bolts 24 enables the sleeve 16 to provide strong support for the side wall 10. The sealing ring 22 in the annular ring 20 presses against the side wall 10 to form an oil-tight seal.

The side wall 110 has a circular opening 114 therein which is comparable to the opening 14 in the wall 10. Moreover, the axis of the opening 114 is alined with the axis of the opening 14 in the sidewall 10 whenever the walls 10 and 110 are in confronting relation. A sleeve 116, identical to the sleeve 16, is provided adjacent the side wall 110; and that sleeve has a heavy and rugged flange 118 that abuts the outer face of the side wall 110. An annular groove 120, identical to the groove 20, is provided in one face of the heavy flange 118; and that groove receives a sealing ring 122. Bolts 124 and lockwashers 126 serve to hold the heavy flange 118 in intimate and reinforcing relation with the side wall 110.

A heavy and rugged tubular member is denoted by the numeral 28, and that tubular member has a machined section 30 spaced inwardly from each of the ends thereof. The machining of the sections 30 reduces the diameters of those sections somewhat below that of the central portion of the tubular member 28. In doing so, that machining forms two radially-directed shoulders 32. The sleeves 16 and 116 telescope over the opposite ends of the tubular member 28 and are held on the machined sections 30 by press fits; and the sleeves 16 and 116 are forced toward each other until the confronting ends thereof abut the shoulders 32 of that tubular member. The engagement of the sleeves 16 and 116 with the tubular member 28 is so intimate and tight that the tubular member 28 and the flanged sleeves 16 and 116 form a sturdy and rigid structural element which gives firm reinforcement to the side walls 10 and 110.

The tubular member 28 is provided with a reduced diameter section 34 adjacent each of the ends thereof. Those reduced diameter sections coact with the machined sections 30 to define radially-directed shoulders 36. A thin ring 38 is dimensioned so it can telescope over the reduced diameter section 34 at the left hand end of the tubular member 28, and that ring will abut the left hand shoulder 36. A thin ring 138 is dimensioned to telescope over the reduced diameter section 34 at the right hand end of the tubular member 28, and that ring will abut the right hand shoulder 36. These rings are of value in providing precise positioning of anti-friction bearings 42 and 142 on the reduced diameter sections 34. For example rings of different widths can be used to fix the precise spacing between the inner races of the anti-friction bearings and the outer faces of the flanges 18 and 118.

Threaded sections 40 are formed on the outer ends of the tubular member 28, and those sections receive internally-threaded nuts 41 and 141. Those nuts are used to hold the inner races of the anti-friction bearings 42 and 142 fixedly in position on the reduced diameter sections 34 of the tubular member 28; those inner races being forced into holding relation with the rings 38 and 138 by the nuts 41 and 141.

The numeral 44 denotes an eccentric disc which has a central cylindrical opening 46 that is concentric with the circular periphery of that disc. That central opening is dimensioned to have a light fit on the outer races of the anti-friction bearing 42. The eccentric disc 44 has an external cylindrical adjusting surface 48 that is eccentric to the central opening 46 and to the periphery of that disc. In addition, the disc 44 has a number of openings 45 to receive bolts 47. Further, the disc 44 has a number of openings 49 to receive bolts, not shown. The bolts 47 releasably secure weights to the eccentric disc 44.

An eccentric disc 144, which is similar to the eccentric disc 44, has a central cylindrical opening 146 that is concentric with the periphery of that disc. The disc 144 has an external cylindrical adjusting surface 148 which is eccentric to the central opening 146 and to the periphery of the disc 144. That adjusting surface has a configuration and eccentricity similar to that of the adjusting surface 48 on the eccentric disc 44. The central opening 146 is dimensioned to have a light fit on the outer race of the anti-friction bearing 142. The eccentric disc 144 has openings 145 to receive bolts 147 and also has openings 149 to receive bolts, not shown. The bolts 147 releasably secure weights 162 to the eccentric disc 144.

The numeral 50 generally denotes a balance wheel that is disposed adjacent the left hand end of the tubular member 28. That balance wheel has a central frusto-conical opening 52, it has a deep cylindrical recess 51, and it has a larger diameter cylindrical recess 54 which is contiguous with the deep recess 51 and which is machined to receive the cylindrical adjusting surface 48 of the eccentric disc 44. The recess 54 defines a cylindrical adjusting surface that is eccentric of the frusto-conical opening 52 and of the circular periphery of the balance wheel 50. A number of holes 58 are provided in the balance wheel 50, and those holes receive bolts that secure weights 62 to the balance wheel. In addition, that balance wheel has holes 60 that can be aligned with the openings 49 to receive bolts that maintain the balance wheel 50 and the eccentric disc 44 in assembled relation. The bolts which hold the weights 62 extend through openings in those weights and seat in the holes 58 in the eccentric disc 44.

The numeral 150 denotes a balance wheel which is similar to the balance wheel 50. The balance wheel 150 has a deep cylindrical recess 151 and has a larger diameter cylindrical recess 154 which is contiguous with the deep recess 151. In addition, the balance wheel 150 has a frusto-conical opening 152 that is concentric with the circular periphery of that balance wheel but which is eccentric of the recess 154. The balance wheel 150 is positioned adjacent the right hand side of the high-speed vibrating screen and its recess 154 accommodates the cylindrical eccentric surface 148 of the eccentric disc 144. Bolts, not shown, will pass through the aligned openings 149 and 160 to secure eccentric disc 144 and the balance wheel 150 together; and other bolts secure weights 162 to that balance wheel.

The eccentric recesses 54 and 154 of the balance wheels 50 and 150 have depths in excess of one half the depths of the recesses 51 and 151 of those balance wheels. This relationship is important because it enables the balance wheels to have their centers of mass close to the anti-friction bearings 42 and 142, thereby reducing the bending moments generated when those balance wheels rotate relative to those bearings.

The balance wheel 50 has a small diameter cylindrical portion 63 that is eccentric of the frusto-conical opening 52. That small diameter portion receives a ring 64 which has an external cylindrical surface and an internal cylindrical surface which are mutually eccentric. Consequently, the ring 64 is of varying thickness. The varying thickness of the ring 64 coacts with the eccentricity of the reduced diameter portion 63 of balance wheel 50 on which it is mounted to provide an adjustable overall eccentricity for that ring when it is mounted on that reduced diameter portion. For example, the ring 64 can be set so its thickest part is adjacent the least eccentric portion of the reduced diameter section 63, it can be set so its thinnest part is adjacent that least eccentric portion, or it can be set at any position in between.

A set screw 66 is seated in a threaded opening in the eccentric ring 64, and that set screw seats in any one of a number of circumferentially spaced openings 65 in the balance wheel. That set screw is able to positively maintain the eccentric ring 64 fixed relative to the balance wheel 50.

The numeral 67 renotes a cylindrical shaft which is positioned within the tubular member 28. That shaft is longer than the tubular member 28; and the opposite ends thereof project outwardly beyond the ends of that tubular member and extend through the frusto-conical openings 52 and 152 of the balance wheels 50 and 150. The shaft 67 has reduced diameter sections 68 adjacent the opposite ends thereof, and those reduced diameter sections coact with the central section of that shaft to provide radially-extending shoulders 70. Those shoulders are in register with the plane defined by the bottoms of the recesses 51 and 151 in the balance wheels 50 and 150.

Split tapered rings 72 telescope over the reduced diameter sections 68 at the opposite end of shaft 67, and the tapered outer faces of those rings engage the frusto-conical openings 52 and 152 of the balance wheels 50 and 150. The tapered rings 72 have threaded elongated, U-shaped recesses therein which are in register with the elongated, U-shaped threaded recesses 56 in the balance wheels 50 and 150. Adjusting screws fit into those elongated, U-shaped recesses and can be rotated to draw those rings and the balance wheels into intimate and tight engagement.

The left hand end of the shaft 67 projects beyond the split tapered ring 72 to receive a second split tapered ring 76. This latter ring releasably supports a pulley 74 which is equipped with a frusto-conical opening at its center.

A mounting ring 78 is provided with a boss and with an annular groove 80. The boss is located adjacent the top of the ring 78, and it has an opening 82 through it to receive a filler plug 84. A sealing ring 86 is mounted in the annular groove 80, and that ring engages the outer face of the side wall 10 whenever the ring 78 is mounted in position. Bolts 88 and lockwashers 90 coact with nuts 92 to fixedly hold the ring 78 in assembled relation with the side wall 10. A similar ring and sealing ring is provided adjacent the outer face of the side wall 110; and lockwashers, bolts and nuts are used to secure this second annular ring and sealing ring in engagement with that side wall.

An oil-tight housing 94 of cup-shaped configuration is suitably secured to the ring 78, as by welding. The engagement between the housing 94 and the ring 78 is such that an oil-tight seal is provided. A circular opening 96 is provided in the flat area of the left hand face of the housing 94, and that opening accommodates the projecting left hand end of the shaft 67, accommodates the sleeve-like portion of the balance wheel 50 and also accommodates the eccentric ring 64. A ring 98 and an annular disc 100 are secured to the oil-tight housing 94 adjacent the opening 96; and the annular disc 100 is concentric with the opening 96. The ring 98 and the annular disc 100 coact with the oil-tight housing 94 to define a sump which will hold any oil thrown off by the slinger on the annular ring 64. A drain hole 102 is provided in the annular disc 100 adjacent the lowermost part of the ring 98. That drain hole will permit oil to drain back into the bottom of the housing 94. A closure 104, with a central opening, is secured to the oil-tight housing 94; and the central opening of that closure is just slightly larger than the outside diameter of the eccentric ring 64.

An oil-tight housing 94 is also secured to the right hand side wall 110, as by being secured to the mounting ring comparable to the ring 78. The oil-tight housing 94 at the right hand side of the high-speed vibrating screen has an opening 96 at its center, but it does not have a ring 98 or an annular disc 100. Instead, it has a cup-shaped closure 106 which is secured to the oil-tight housing 94 in register with the opening 96 of that housing.

In assembling the high speed vibrating screen provided by the present invention, either the sleeve 16 or the sleeve 116 is pressed onto its intended machined section 30 of the tubular member 28. Thereafter, the other end of the tublar member 28 is passed through the opening 14 or 114 of the side wall which is to abut the radially directed flange of the mounted sleeve. That other end of the tubular member 28 is also passed through the circular opening of the other side wall; and thereafter the other sleeve is pressed onto the other machined section 30 of that tubular member. Once the other sleeve has been pressed onto the machined section 30 of the tubular member 28, the other side plate can be moved outwardly into abutting engagement with, and can be bolted to, the flange of the other sleeve. The mounting pedestals are then secured to the side walls 10 and 110 to facilitate the further assembly of parts of the high speed vibrating screen.

The rings 38 and 138 are telescoped over the reduced diameter sections 34 of the tubular member 28 until the confronting faces of those rings abut the shoulders 36. At this time, the inner races of the anti-friction bearings 42 and 142 are telescoped onto the reduced diameter sections 34 until the confronting faces of those inner races abut the rings 38 and 138. The nuts 41 and 141 are then threaded onto the threaded portions 40 at the opposite ends of the tubular member 28; and those nuts are tightened until they fixedly hold the inner races of the anti-friction bearings 42 and 142 and also hold the rings 38 and 138 stationary on the tubular member 28. Rings 38 and 138 of the required width will be selected to compensate for possible manufacturing tolerances in the machining of the shoulders defined by the reduced diameter sections 34.

Once this has been done, the eccentric discs 44 and 144 are telescoped onto the outer races of the anti-friction bearings 42 and 142. This is done quite readily since there is only a light fit between the concentric openings 46 and 146 of those discs and the outer races of the bearings 42 and 142. At this time, the shaft 67 is telescoped into the tubular member 28, and it is positioned so the opposite ends thereof project outwardly beyond both ends of the tubular member 28. The balance wheels 50 and 150 are then set over the projecting ends of the shaft 67 until the eccentric recesses 54 and 154 thereof telescope onto the eccentric surfaces 48 and 148 of the discs 44 and 144. This is easily accomplished since the mating surfaces are machined for ready relative rotation. The discs 44 and 144 and the balance wheels 50 and 150 have markings on them which enable the desired degree of eccentricity to be set equally at both sides of the high speed vibrating screen. The weights 62 are then mounted on the balance wheels by the bolts which extend through the openings 58 and on the eccentric discs by the bolts 47 and 147. Other bolts, not shown, will be passed through the openings 60 and 49 and 160 and 149 to hold the eccentric discs and the balance wheels for conjoint rotation.

At this time, the balance wheels 50 and 150 are rotated until the elongated, U-shaped notches therein are in register with the complementary notches in the split tapered rings 72. The set screws, not shown, are then inserted and rotated to force the split rings 72 into intimate and tight relationship with the frusto-conical openings of the balance wheels 50 and 150. As those screws are tightened, the split-tapered rings 72 will tend to move toward each other; but those rings will be held against undue movement toward each other by the engagement of their inner faces with the shoulders 70 on the shaft 67. After the split rings 72 have engaged those shoulders, any further tightening of the set screws will move the balance wheels 50 and 150 outwardly.

The shoulders 70 are machined so that the bottoms of the recesses 54 and 154 in the balance wheels 50 and 150 are always spaced a short distance from the outer races of the anti-friction bearings 42 and 142. This keeps the balance wheels from applying axially-directed inward side thrusts to the bearings. The light fit between the concentric openings 46 and 146, of discs 44 and 144, and the outer races of the anti-friction bearings 42 and 142 keeps the balance wheels 50 and 150 from applying axially-directed outward side thrust to the bearings; those discs moving relative to those outer races before hurtful side thrusts can be generated. Consequently, if the balance wheels 50 and 150 are moved still further outwardly by continued rotation of the set screws, that outward movement can not apply hurtful sidethrusts to the bearings because the eccentric discs 44 and 144 will move outwardly relative to those bearings.

Suitable markings are provided on the balance wheels 50 and 150, and on the opposite ends of the shaft 67 to enable those balance wheels to be set in precisely corresponding positions. The engagement between the tapered split rings 72, the shaft 67, and the balance wheels 50 and 150 is so tight and so intimate, when the split tapered rings are fully seated, that the balance wheels will not shift relative to the shaft.

The balance wheels are thus maintained in precise registry with each other.

At this time, the rings 78 and the oil-tight housings 94 are bolted to the side walls 10 and 110. The right hand oil-tight housing 94 can then have the cup-like closure 106 mounted on it to close the opening 96 in that housing. The recess defined by the annular disc 100, the ring 98 and the left hand oil-tight housing 94 will be open because the annular disc 104 has not yet been mounted. Before that latter disc is mounted, the eccentric ring 64 is telescoped into position on the reduced diameter portion of balance wheel 50. That ring will be adjusted so its eccentricity will offset the eccentricity of the eccentric disc 44; and in this way, the periphery of that ring will be substantially concentric with the ring 98. Once this has been done, closure plate 104 is bolted in position.

The pulley 74 can now be telescoped over the projecting left hand end of the shaft 67, and the split tapered ring 76 can be inserted within the frusto-conical opening of that pulley. A set screw suitably locks the pulley 74 and the tapered sleeve 76 together, and also locks both of them to the shaft 67.

The tubular member 28 is massive and rugged, and so are the sleeves 16 and 116 with their radially directed flanges 18 and 118. The tubular member 28 coacts with those sleeves and flanges to provide a rugged and sturdy structural element that gives adequate and full support to the side walls 10 and 110. That support is so great that it resists the large bending moments that are experienced when the balance wheels are set to provide maximum eccentricity and heavy overloads are continued for prolonged periods of time. Furthermore, the machining of the balance wheels 50 and 150 to make the eccentric recesses 54 and 154 longer than one half the total depth of the recesses 51 and 151 reduces the bending moments which the tubular member 28 and the sleeves 16 and 116 must withstand. The result is that the high-speed vibrating screen provided by the present invention is strongly resistant to fracturing of the sideplates.

When the shaft 67 is first rotated, it will move eccentrically, and the side walls 10 and 110 will remain stationary. However, as that shaft gets up to speed, its mass and that of the balance wheels will enable that shaft to rotate concentrically; and thereupon, the side walls 10 and 110 will be driven up and down by the tubular member 28 and the sleeves 16 and 116. Screens or grids will be suitably secured to the side walls 10 and 110, and the up and down movement of those screens and grids will assure the desired screening action. The extent of the up and down movement of the screens and the grids will be determined by the setting of the eccentric discs 44 and 144 relative to the balance wheels 50 and 150.

Whereas the drawing and accompanying description have shown and described a preferred embodiment of the present invention it should be apparent to those skilled in the art that various changes may be made in the form of the invention without affecting the scope thereof.

What I claim is:

1. A high speed vibrating device that comprises a frame with two spaced-apart side walls, an opening in each of said side walls, said openings being in register with each other, a tubular member extending between said side walls and having the opposite ends thereof projecting through said openings, anti-friction bearings having the inner races thereof fixedly mounted on said opposite ends of said tubular member, discs that are loosely mounted on the outer races of said anti-friction bearings, said discs having cylindrical adjusting surfaces that are eccentric to said outer races, balance wheels that have cylindrical adjusting surfaces complementary to said adjusting surfaces of said discs and that have tapered central openings, said adjusting surfaces of said balance wheels being eccentric to said tapered central openings, a shaft that extends through said tubular member and through said tapered central openings in said balance wheels, tapered sleeves that telescope over the opposite ends of said shaft and that engage and fit within said tapered central openings in said balance wheels, radially projecting shoulders on said shaft to limit movement of said tapered sleeves toward each other, said shoulders being spaced apart sufficiently to maintain a space between said balance wheels and the races of said anti-friction bearings despite manufacturing tolerances, and mounting rings that have axially-extending sleeve portions and that have radially extending flange portions, said axially-extending sleeve portions extending inwardly through said openings in said side walls and telescoping snugly over said tubular member, said radially extending flanges abutting the outer faces of said side walls and being rigidly secured to same, said tubular member and said mounting rings constituting the principal bending-resisting elements of said high speed vibrating device.

2. A high speed vibrating device that comprises a frame with two spaced-apart side walls, an opening in each of said side walls, said openings being in register with each other, a tubular member extending between said side walls and having the opposite ends thereof projecting through said openings, anti-friction bearings having the inner races thereof fixedly mounted on said opposite ends of said tubular member, discs that are loosely mounted on the outer races of said anti-friction bearings, said discs having arcuate adjusting surfaces that are eccentric to said outer races, balance wheels that have arcuate adjusting surfaces complementary to said adjusting surfaces of said discs and that have tapered central openings, said adjusting surfaces of said balance wheels being eccentric of said tapered central openings, a shaft that extends through said tubular member and through said tapered central openings in said balance wheels, tapered sleeves that telescope over the opposite ends of said shaft and that engage and fit within said tapered central openings in said balance wheels, and radially projecting shoulders on said shaft to limit movement of said tapered sleeves toward each other, said shoulders being spaced apart sufficiently to provide a space between said balance wheels and the races of said anti-friction bearings despite manufacturing tolerances.

3. A high speed vibrating device that comprises a frame with two spaced-apart side walls, an opening in each of said side walls, said openings being in register with each other, a tubular member extending between said side walls and having the opposite ends thereof projecting through said openings, heavy and massive rings that abut the outer faces of said side walls, said rings having sleeve portions that telescope over said opposite ends of said tubular member and that are directed toward each other, said sleeve portions of said rings extending through said openings in said side walls, anti-friction bearings having the inner races thereof fixedly mounted on said opposite ends of said tubular member immediately adjacent said rings, eccentrics rotatable relative to said inner races of said anti-friction bearings, a shaft that extends through said tubular member and provides simultaneous rotation for said eccentrics, said tubular member and said rings limiting bending of said device as said eccentrics rotate.

4. A high speed vibrating device which comprises a pair of spaced-apart side walls, a structural element extending between said side walls and maintaining said side walls in fixedly spaced relation, a pair of anti-friction bearings with their inner races fixedly mounted adjacent the outer faces of said side walls, balance wheels that rotate with the outer races of said bearings but that can move axially relative to said outer races of said bearings, a shaft to rotate said balance wheels, said balance wheels having frusto-conical central openings therein, a shoulder on said shaft adjacent each of the ends thereof, and externally tapered sleeves that telescope over the ends of said shaft and are limited against undue movement toward each other by said shoulders, said shoulders and said tapered sleeves coacting to limit movement of said balance wheels toward each other, thereby minimizing side thrust on said anti-friction bearings.

5. A high speed vibrating device that comprises a frame with two spaced-apart side walls, an opening in each of said side walls, said openings being in register with each other, a tubular member extending between said side walls and having the opposite ends thereof projecting through said openings, anti-friction bearings having the inner races thereof fixedly mounted on said opposite ends of said tubular member, discs that are loosely mounted on the outer races of said anti-friction bearings, said discs having arcuate surfaces that are eccentric to said outer races, balance wheels that have arcuate surfaces complementary to said surfaces of said discs and that have tapered central openings, said surfaces of said balance wheels being eccentric of said tapered central openings, a shaft that extends through said tubular member and through said tapered central openings in said balance wheels, tapered sleeves that telescope over the opposite ends of said shaft and that engage and fit within said tapered central openings in said balance wheels, and surfaces on said shaft to limit movement of said tapered sleeves toward each other, said surfaces being spaced apart sufficiently to provide a space between said balance wheels and the races of said anti-friction bearings despite manufacturing tolerances.

6. A high speed vibrating device which comprises a pair of spaced-apart side walls, a structural element extending between said side walls and maintaining said side walls in fixedly spaced relation, a pair of anti-friction bearings with their inner races fixedly mounted adjacent the outer faces of said side walls, balance wheels that rotate with the outer races of said bearings but that can move axially relative to said outer races of said bearings, a shaft to rotate said balance wheels, said balance wheels having frusto-conical central openings therein, a shoulder on said shaft adjacent each of the ends thereof, and externally tapered sleeves that telescope over the ends of said shaft and are limited against undue movement toward each other by said shoulders, said shoulders and said tapered sleeves coacting to limit movement of said balance wheels toward each other, thereby minimizing side thrust on said anti-friction bearings, said structural element being a tube that surrounds and encloses said shaft, said inner races of said anti-friction bearings being mounted on the ends of said tube.

7. A high speed vibrating device which has spaced apart side walls, a tube extending between said side walls and passing through aligned openings in said side walls, flanged supporting sleeves mounted on said tube at points spaced inwardly from the ends of said tube, said sleeves abutting the outer faces of said side walls, anti-friction bearings at the opposite ends of said tube, eccentric discs mounted on the outer races of said anti-friction bearings, said eccentric discs having cylindrical adjusting surfaces thereon, and balance wheels, said balance wheels having recesses to accommodate the ends of said tubular member and having cylindrical recesses contiguous with the first said recesses to accommodate said adjusting surfaces on said eccentric discs, said cylindrical recesses having depths greater than one half the depths of the first said recesses in said balance wheels.

References Cited in the file of this patent

UNITED STATES PATENTS

| | | |
|---|---|---|
| 2,267,143 | Soldan | Dec. 23, 1941 |
| 2,677,967 | Galbraith | May 11, 1954 |